United States Patent [19]

Anderson

[11] 4,186,765
[45] Feb. 5, 1980

[54] LIQUID LEVEL CONTROL VALVE ASSEMBLY

[76] Inventor: Robert V. Anderson, 3900 Summercrest Dr., Fort Worth, Tex. 76109

[21] Appl. No.: 885,810

[22] Filed: Mar. 13, 1978

[51] Int. Cl.$^2$ .................... F16K 31/28; F16K 33/00
[52] U.S. Cl. .................... 137/414; 73/322.5; 137/423; 137/426; 137/432; 251/46
[58] Field of Search .......... 137/414, 423, 424, 429, 137/430, 432, 437, 426, 445, 447, 449, 451; 251/45, 46; 73/322.5

[56] References Cited

U.S. PATENT DOCUMENTS

| 3,049,010 | 8/1962 | Holderith | 73/322.5 |
|---|---|---|---|
| 3,115,153 | 12/1963 | Delamater | 137/413 |
| 3,144,874 | 8/1964 | Goldtrap | 137/414 |
| 3,194,258 | 7/1965 | Grant | 137/414 |
| 3,285,277 | 11/1966 | Goldtrap | 137/414 |
| 3,321,972 | 5/1967 | Goldtrap | 137/414 |
| 3,554,219 | 1/1971 | Hudson | 137/414 |
| 3,729,017 | 4/1973 | Brandelli | 137/414 |
| 3,982,556 | 9/1976 | Roosa | 137/432 |

Primary Examiner—Martin P. Schwadron
Assistant Examiner—G. L. Walton
Attorney, Agent, or Firm—Schmidt, Johnson, Hovey & Williams

[57] ABSTRACT

A main valve diaphragm closes the liquid inlet to the tank when the latter is full because ballast members associated with a pilot valve have their gravitational effects negated as a result of liquid in the tank being above or at substantially the same level as such members, thereby allowing the buoyancy of a float to maintain the pilot valve closed. On the other hand, when the liquid in the tank drops to a predetermined level, the ballast members become effective to gravitationally operate the pilot valve which in turn releases hydraulic pressure in a chamber above the diaphragm that otherwise keeps the diaphragm seated. The pair of ballast members on the exterior of the assembly are each independently adjustable into any one of a number of selected vertical positions along the assembly, the position of the upper member determining the location of the upper level of liquid in the tank, while the position of the lower ballast member determines how far the liquid level will drop before the valve diaphragm is unseated to allow the entry of a new supply. All components of the assembly are designed for installation without the aids of tools. Alternative versions of atmospheric breaks render the assembly anti-siphon.

23 Claims, 20 Drawing Figures

LIQUID LEVEL CONTROL VALVE ASSEMBLY

TECHNICAL FIELD

This invention relates to control valves for regulating the level of liquids in storage tanks and also the refill of such liquids when the supply has been depleted to a certain predetermined level.

BACKGROUND ART

A wide variety of mechanisms have heretofore been available for use in controlling the liquid level in supply tanks. For example, many have taken the form of so-called "ball cocks" utilized in water closets to establish a sufficiently high water level that a satisfactory flush of the toilet can be obtained. Such ball cocks must open the inlet line during a flush so as to permit the supply of water in the tank to be replenished, and must then be capable of shutting off automatically after the supply reaches a predetermined level in the tank.

Typical modern ball cocks operate without levers and cranks and utilize what might be termed a "pilot valve" principle in which a small secondary or "pilot" valve controls opening and closing of a main valve diaphragm through the use of a pressure chamber directly overlying the diaphragm and exposed to supply line pressure. As long as the pilot valve is closed, the pressure in this chamber is operable to retain the diaphragm seated because the surface area thereof exposed to such chamber is greater than that exposed to the supply line on the opposite side of the diaphragm. However, when the pilot valve is unseated, as a result of an operating input during a flush cycle, pressure in the overhead chamber is immediately released so as to open the diaphragm and allow the entry of a new supply of water.

Examples of ball cocks operating more or less on this principle may be found in the following patents:

| | |
|---|---|
| Goldtrap | 3,144,875 |
| Goldtrap | 3,144,874 |
| Schoepe, et al | 3,319,913 |
| Schoepe, et al | 3,495,803 |
| Schoepe, et al | 3,428,966 |
| Schoepe, et al | 3,429,333 |
| Schoepe, et al | 3,559,675 |
| Schoepe, et al | 3,576,199 |
| Holderith | 3,049,010 |
| Doyle | 2,808,850 |
| Layton | 2,318,236 |
| Crockett | 2,608,990 |
| Langdon | 1,626,289 |
| Richardson | 2,678,058 |
| Martinez | 2,784,733 |
| Svirsky | 2,730,122 |
| Australian Patent Spec. | 153,027 |
| Buckner | 2,744,536 |

One serious fault with ball cocks heretofore available has resided in the fact that they open the supply line to the tank too early in the flush cycle, and thus waste a surprisingly large amount of water during each flush of the tank. In other words, prior ball cocks have started bringing in new water before all of that in the tank has been depleted, and thus a certain portion of the new water is flushed along with the volume stored in the tank instead of helping to replenish the supply.

As will be apparent from the discussion which follows, the principles of the present invention are not limited for use in connection with ball cocks, but also may be employed in a number of other areas where accurate and reliable liquid level control is required. For example, large outdoor storage tanks for petroleum products require some means for refilling the tanks automatically when they have been drained to a certain level. Control systems that employ electrical devices in conjunction with level control are entirely unsuitable for this purpose in view of the danger of explosion, and thus the present invention becomes attractive because of its ability to operate totally without an external source of power and in response solely to the level conditions within the tank.

In most instances it is desirable to allow the level of such storage tanks to drop to a certain predetermined minimum before actuating the refill cycle so that the refill control mechanism is not constantly flipping off and on so as to maintain the level at some upper predetermined point. In keeping with the principles of the present invention, this type of delayed actuation of the refill cycle in response to the liquid level dropping to a considerably low point is readily obtainable.

Governmental regulations require that all liquid level controls for use in water closets be so designed that in the event of a failure in the municipal water supply line which changes the positive supply pressure to a negative suction pressure, water in the tank will not be sucked out. Several of the assemblies found in the foregoing list of patents are provided with mechanisms designed to meet this type of requirement, but for a variety of reasons, they have been less than totally satisfactory.

SUMMARY OF THE INVENTION

The invention follows the known "pilot valve" concepts as above-discussed, but expands upon this principle so as to delay the start of the refill cycle until the liquid drops substantially in the tank to a lower predetermined level. The precise point at which the refill cycle is started may be selectively varied at the discretion of the installer and/or user without the assistance of external tools of any kind. This new feature is obtained by virtue of the fact that the heretofore single ballast member utilized in pilot valve type ball cocks has been divided into a pair of independent, upper and lower ballast members, the lower of which may be adjusted up and down along a supporting housing for the members.

The location of the upper ballast member determines the uppermost level that the liquid is permitted to reach in the tank, and this, too, is adjustable vertically in the same manner as is the lower member. During depletion of the liquid from the tank, the level drops below the upper ballast member, but the weight thereof is insufficient to overcome the buoyant effect of a float beneath the lower ballast member combined with supply pressure on the pilot valve tending to keep the latter seated. Only after the level drops down below the lower member so that its gravitational effects can be combined with those of the upper member is the force sufficiently great to unseat the pilot valve and start the refill cycle.

During refill, liquid continues to be supplied into the tank as the level rises above the lower ballast member, negating its effects while increasing the buoyancy of the float. However, the float buoyancy is insufficient to overcome the upper ballast member, and it is not until the liquid reaches a certain predetermined upper level near the top edge of the upper ballast member that its gravitational effects are sufficiently negated to enable the buoyancy of the float to raise the housing and thereby reseat the pilot valve which, in turn, causes the main diaphragm to close, thereby terminating the refill cycle.

Two versions of anti-siphon atmospheric breaks are disclosed. The first version is what might be termed an "integral" break, wherein a fitting on the assembly which is used to connect the same to a conduit leading to the overflow pipe has one or more lateral holes therein which communicate with the atmosphere so that, if a suction is produced by a reversal in supply pressure, the suction will be broken by virtue of the communication with the atmosphere via the holes in the fitting. Thus, the liquid cannot be drained from the tank.

A second version may be termed a universal break, in that it may be used with any type of liquid level control valve. The universal version is in the form of a cap which attaches onto the open uppermost end of the overflow pipe. The cap has provision to permit the overflow of liquid into the pipe should that be necessary, and yet has at its point of connection with the conduit leading from the refill valve, provision to allow the entry of atmospheric air into the conduit so as to break the suction back in the valve assembly.

DETAILED DESCRIPTION

Figure 1:
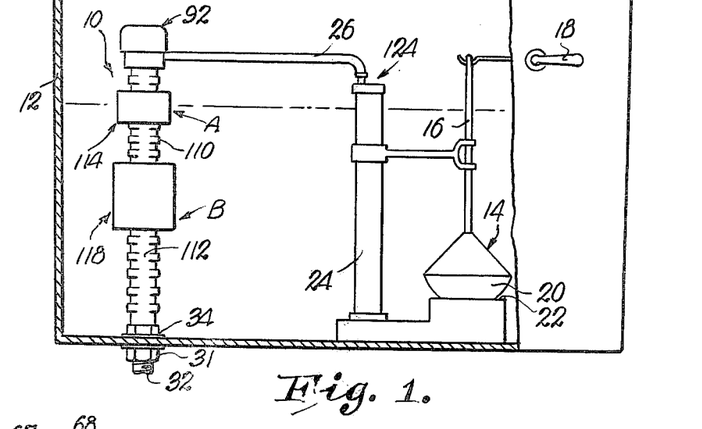
FIG. 1 is a fragmentary elevational view partially in cross section illustrating how one form of a valve constructed in accordance with the principles of the present invention might be incorporated into a typical water closet of a toilet.

As explained above, FIG. 1 illustrates the assembly 10 of the present invention in connection with a tank 12 in the nature of a water closet commonly associated with a toilet, but it will become apparent that the principles of the present invention are not limited to this particular environment. In any event, the tank 12 contains a flush valve 14 having an upright rod 16 connected to a handle 18 for operation of the valve 14. The latter also includes a stopper 20 which normally sits on a seat 22 containing an outlet (not shown) leading to the toilet bowl. An upright overflow pipe 24 also is in communication with the toilet bowl and has a connection at its upper end to a conduit or line 26 leading from the valve 10, such pipe 24 being used both to handle overflow and to refill the bowl and its trap following the flush cycle.

Figure 2:
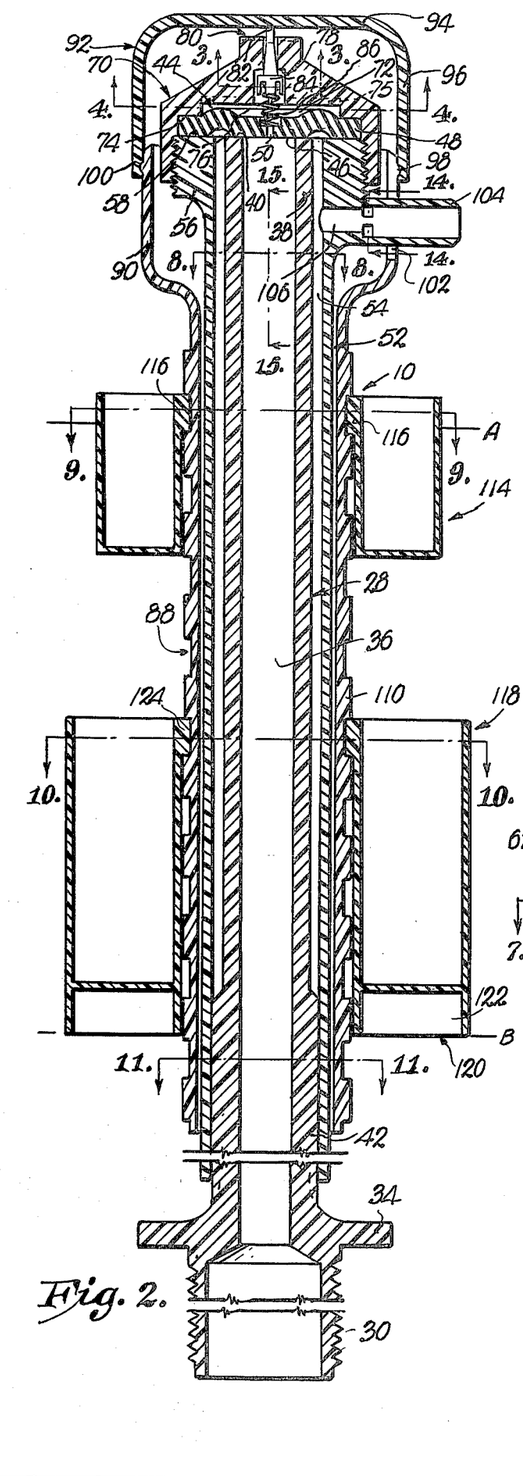
FIG. 2 is an enlarged, vertical cross-sectional view of said one form of valve assembly having an integral anti-siphon break.
Figure 3:
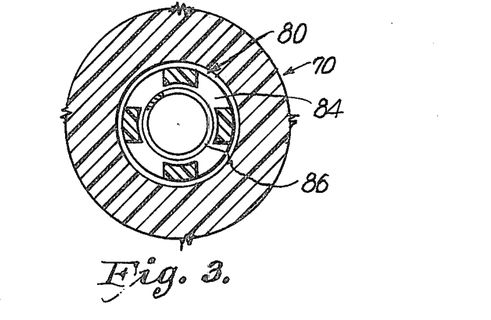
FIG. 3 is an enlarged cross-sectional view thereof taken along line 3—3 of FIG. 2.

The assembly 10 includes a tube 28 having a lowermost threaded end 30 adapted to be attached to the floor of the tank 12 in liquid communication with a supply inlet 32 connected with a source of liquid. An integral annular flange 34 immediately above the threaded end 30 projects radially outwardly beyond the latter and cooperates with a locknut 31 to hold the tube 28 in a vertical position. A cylindrical passage 36 is defined internally of the tube 28 extending along the full length of the latter, and the opposite upper end 38 of the tube 28 is provided with an annular valve seat 40. A plurality of radially outwardly projecting ribs 42 are provided on the tube 28 adjacent the lower end 30 thereof and above the flange 34.

A valve diaphragm 44 lies across the upper end 38 of the tube 28 and has a lower side 46 that covers the passage 36 and is disposed for seating engagement against the seat 40. The diaphragm 44 also projects radially outwardly beyond the seat 40 and terminates in a marginal periphery 48. A small orifice 50 extends completely through the diaphragm 44 on the center line of the latter and the tube 28.

A sleeve 52 coaxially and concentrically receives the tube 28 and has an internal diameter slightly larger than the outer diameter of the tube 28 so as to define an annular passage 54 therebetween. The upper end 56 of the sleeve 52 is enlarged and provides an annular, fairly wide terminus 58 that underlies the marginal periphery 48 of the diaphragm 44. The ribs 42 of the tube 28 space the sleeve 52 outwardly from the tube 28 adjacent said lower end 30 thereof, while adjacent the upper end 56 of the sleeve 52, interlock structure 60 releasably holds the sleeve 52 and the tube 28 in proper relationship to one another against either axial or radial shifting.

Figure 7:
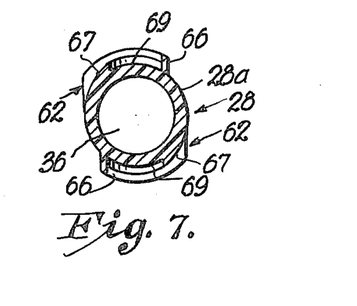
FIG. 7 is a transverse cross-sectional view thereof taken along line 7—7 of FIG. 5.
Figure 8:
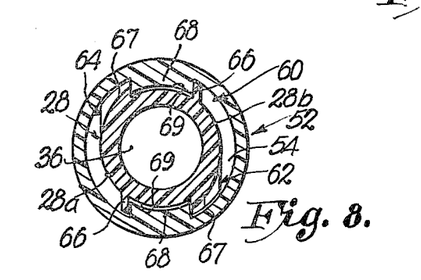
FIG. 8 is a transverse cross-sectional view through the valve assembly taken along line 8—8 of FIG. 2.
Figure 9:
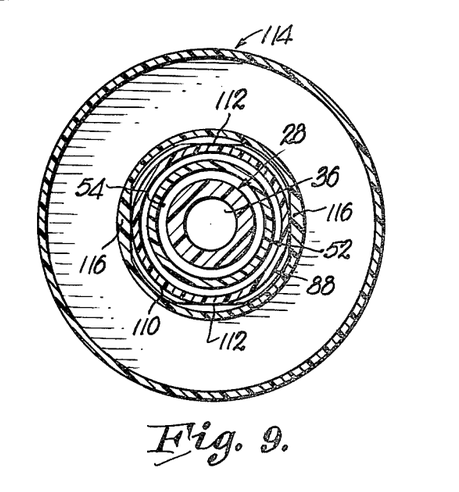
FIG. 9 is a transverse cross-sectional view of the valve assembly taken along line 9—9 of FIG. 2.
Figure 10:
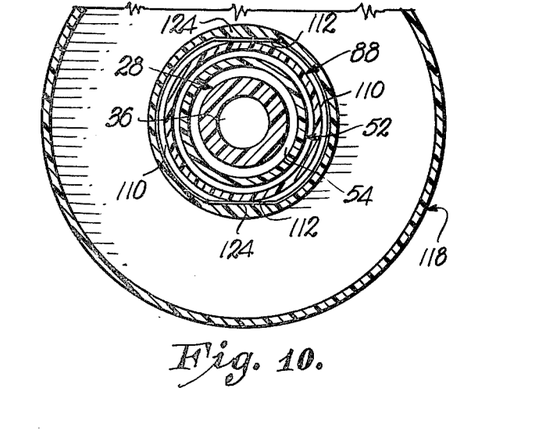
FIG. 10 is a transverse cross-sectional view of the valve assembly taken along line 10—10 of FIG. 2.
Figure 11:
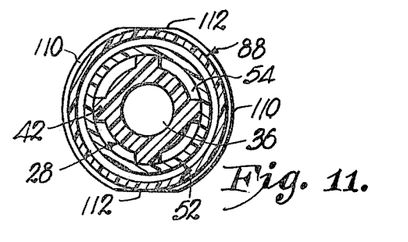
FIG. 11 is a transverse cross-sectional view of the assembly taken along line 11—11 of FIG. 2.
Figure 15:
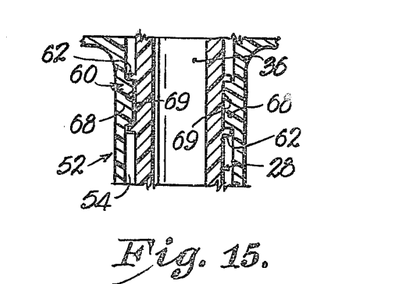
FIG. 15 is a fragmentary, vertical cross-sectional view rotated ninety degrees (90°) from FIG. 2 for the purpose of illustrating the way in which the upstanding tube and sleeve therearound are physically interlocked.

As shown in FIGS. 5, 6, 7, 8 and 15, the interlock structure 60 includes a pair of diametrically opposed, transversely extending trackways 62 and 64 on the tube 28, each having a generally U-shaped rim 66 that serves to close off the lateral boundaries of the trackways 62, 64 and also the innermost end thereof while leaving the opposite entry end open. A pair of diametrically opposed, inwardly projecting nibs 68 on the sleeve 52 are adapted to be matingly received by the trackways 62 as illustrated in FIGS. 8 and 15. Each trackway 62 includes a ramp 67 (FIGS. 7, 8) starting at the entry thereof and leading toward the bight of rim 66, there being a socket 69 at the termination of each ramp 67 conforming to the configuration of the nibs 68. Thus, when nibs 68 are vertically aligned with trackways 62 adjacent the entry end of ramps 67, the tube 28 and the sleeve 52 may then be rotated relative to one another in a direction to bring the nibs 68 up the ramps 67 and into the sockets 69, the latter serving to yieldably hold the tube 28 and the sleeve 52 interlocked. As illustrated in FIGS. 7 and 8, the surface area 28a and 28b of the tube 28 between the two trackways 62 and 64 provides clearance for the nibs 68 when the tube 28 and the sleeve 52 are shifted axially of one another during assembly and prior to rotatively interlocking the two components.

Figure 4:
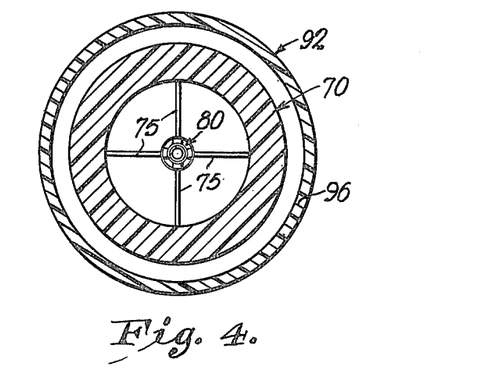
FIG. 4 is a transverse cross-sectional view thereof taken along line 4—4 of FIG. 2.
Figure 5:
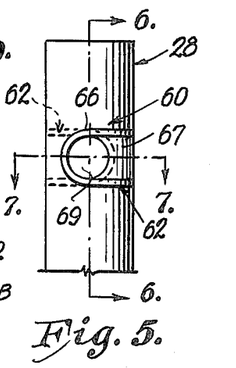
FIG. 5 is a fragmentary elevational view of the supply tube adjacent the upper end thereof illustrating the interlock structure by which a surrounding sleeve is releasably secured to the tube.
Figure 6:
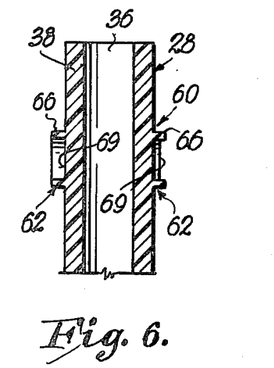
FIG. 6 is a vertical cross-sectional view thereof taken along line 6—6 of FIG. 5.

The exterior of the upper end 56 of the sleeve 52 is matingly threaded with respect to an internally threaded cap 70 that screws down onto the sleeve 52. The cap 70 is provided with a cavity 72 that receives the diaphragm 44 during vertical flexure of the latter toward and away from the seat 40, the cap 70 also having an annular abutment 74 that overlies the marginal periphery 48 of the diaphragm, 44 and thus cooperates with the terminus 58 of the sleeve 52 to clamp the diaphragm 44 tightly in place. The marginal periphery 48 is therefore rendered immobile, although the remaining portion of the diaphragm 44 radially inwardly of the clamped marginal periphery 48 is free to flex toward and away from the seat 40. Radially extending webs 75 (FIG. 4) in the cap 70 above the diaphragm 44 are to prevent the same from being held open by vacuum when diaphragm 44 is in its uppermost, flexed position away from seat 40.

The cavity 72 in the cap 70 cooperates with the upper side of the diaphragm 44 to define a pressure chamber 76 that is maintained in constant communication with the inlet passage 36 by virtue of the small orifice 50 through the diaphragm 44. The surface area on the upper side of the diaphragm 44 exposed to the chamber 76 is greater than the surface area on the lower side of diaphragm 44 exposed to the inlet passage 36.

Figures 13, 14:
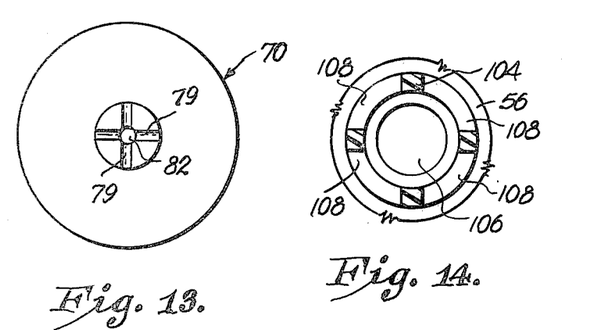
FIG. 13 is a top plan view of the valve assembly, with the closure cap thereof removed for the purpose of illustrating the intersecting relief channels on the uppermost end of the cap.
FIG. 14 is a fragmentary, cross-sectional view taken along line 14—14 of FIG. 2 in order to illustrate further details of the integral anti-siphon break.

The cap 70 also has a central bore 78 therethrough in coaxial registration with the orifice 50 in the diaphragm 44. Cross channels 79 (FIG. 13) in the uppermost surface of the cap 70 intersect at the bore 78. A pilot valve 80 has a stem 82 extending through the bore 78 and reciprocal longitudinally therein, the stem 82 projecting outwardly beyond the adjacent external portions of the cap 70 as illustrated in FIG. 2. A lower head 84 of the pilot valve 80 receives the biasing force of a light duty coil spring 86 located between the valve 80 and the diaphragm 44 so as to serve as a return means for the valve 80. In the position illustrated in FIG. 2, the valve 80 seals the bore 78 so as to preclude the escape of liquid from the pressure chamber 76, but it is to be understood that when the stem 82 of the valve 80 is depressed, the bore 78 will be opened as a result of the tapered configuration of the stem 82. In lieu of the return spring 86, the pilot valve 80 might be constructed of a buoyant material so as to normally seal off the escape bore 78 when liquid is present in the pressure chamber 76.

A tubular housing 88 coaxially receives the sleeve 54 and is reciprocable vertically along the latter between a pair of upper and lower limits. The upper end 90 is open and is enlarged with respect to the remaining portion therebelow so as to receive the laterally enlarged upper end 56 of the sleeve 52 and also to receive the adjacent portions of the cap 70. A closure 92 having a transverse top 94 and a depending annular wall 96 snaps onto the upper end 90 of the housing 88 through the provision of an annular lip 98 on the upper end 90 of the housing 88 which fits within an annular groove 100 in the lower end of the depending wall 96. The dimensions of the snap-fitting parts are such that the wall 96 or the end 90 of the housing 88 are caused to resiliently yield slightly so as to secure a snug snap-fit of the lip 98 within the groove 100.

The top 94 of the closure 92 is disposed for abutting engagement with the uppermost end of the stem 82 of the pilot valve 80 and normally remains in such abutting engagement throughout operation of the assembly 10. A vertically extending slot 102 in the upper end 90 of the housing 88 provides clearance for a laterally projecting fitting 104 that communicates with a lateral aperture 106 in the upper end 56 of the sleeve 52. The lateral aperture 106 joins with the annular passage 54 and thus serves as a source of refill liquid for the refill line 26 that is coupled with the fitting 104. A plurality of lateral holes 108 in the fitting 104 (FIGS. 2 and 14) communicate the aperture 106, and thus the passage 54, with the atmosphere such as to form an anti-siphon break that is "integral" with the rest of the assembly 10. Fitting 104 and holes 108 are disposed well above the normal liquid level within tank 12. The diameter of the aperture 106 is less than the inside diameter of the fitting 104. Thus, when there is flow through aperture 106, the stream is aerated by aspiration of air into the stream through holes 108.

The exterior of the housing 88 is provided with a longitudinally extending series of transversely extending ledges 110. Although the ledges 110 are generally of annular configuration, their circular configuration is interrupted by a pair of diametrically opposed, longitudinally extending relieved strips 112 extending the full length of the series of ledges 110. An upper ballast member 114 is in the nature of an annular cup provided with a pair of diametrically opposed shoulders 116 that project radially inwardly from the internal periphery of the member 14. The shoulders 116 are so sized as to slide along the recess strips 112 when the upper member 114 is rotatively positioned so as to align the shoulders 116 with the strips 112, and yet the shoulders 116 may be slipped into the annular spaces between adjacent ones of the ledges 110 when the upper member 114 is rotated so as to position the shoulders 116 into overlying relationship to the selected ledge 110. This arrangement thereby releasably attaches the member 114 to the housing 88 in any one of a number of selected vertical positions along the latter.

The housing 88 also carries a lower ballast member 118 having an intergral float 120 at the bottom thereof. The lower member 118 is also in the nature of a cup with its top entirely open, while the float 120 is in the nature of an inverted cup with its bottom entirely open so as to trap air within the chamber 122 thereof during operation. As with the upper member 114, the lower member 118 has a pair of diametrically opposed shoulders 124 projecting radially inwardly from the inner periphery thereof for cooperation with the recess strips 112 and the ledges 110 in the same manner as the shoulders 116 of the upper ballast member 114. Thus, the lower ballast member 118 may be shifted vertically along the housing 88 into any one of a number of selected positions.

Figure 12:
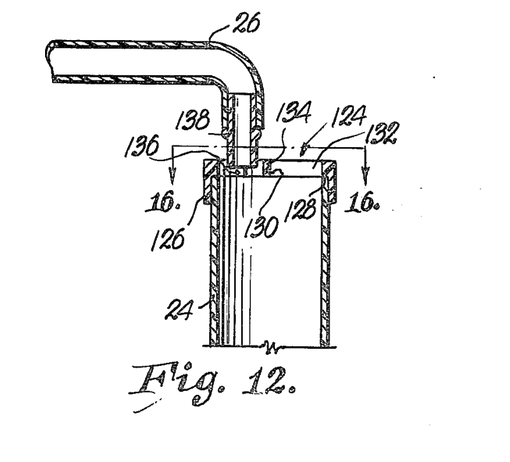
FIG. 12 is a fragmentary, vertical cross-sectional view taken through the overflow pipe of FIG. 1, and illustrating the universal anti-siphon break.
Figures 16, 17, 18, 19, 20:
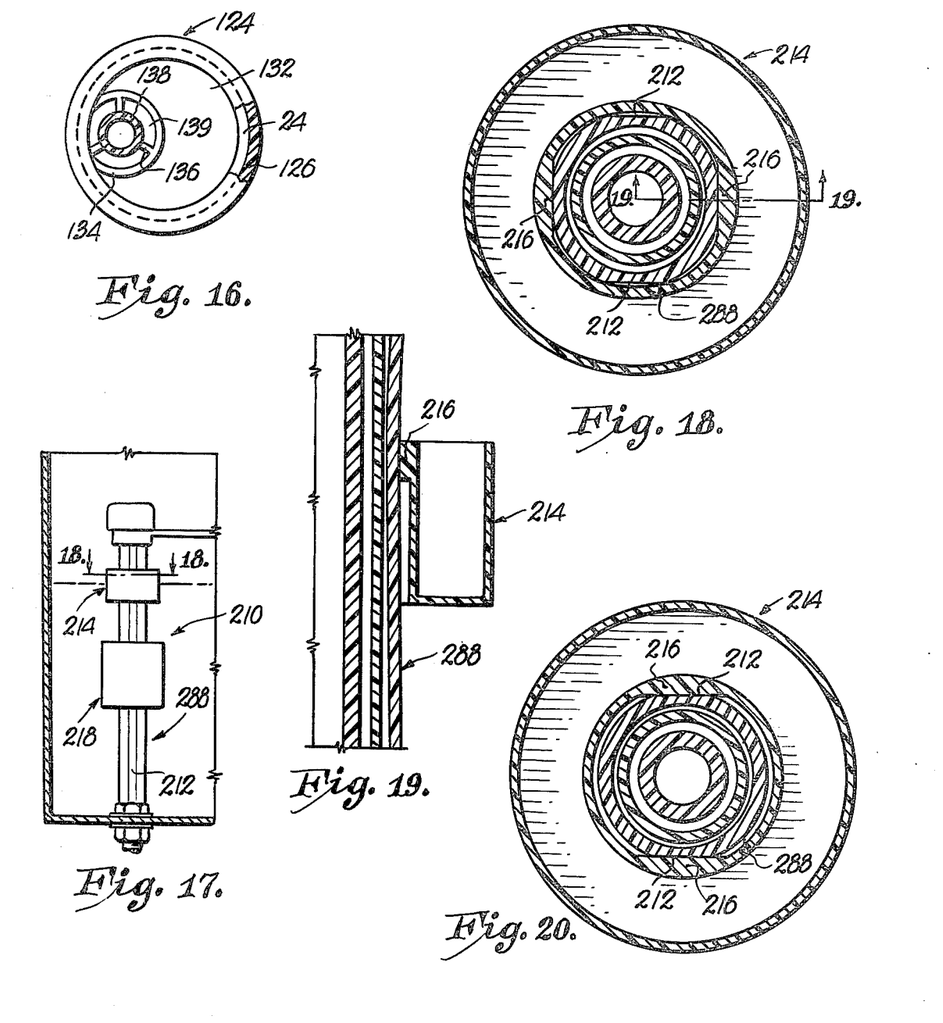
FIG. 16 is a horizontal cross-sectional view of the structure in FIG. 12, taken along line 16—16 thereof to show details of construction.
FIG. 17 is a fragmentary elevational view of an alternative embodiment of the control assembly in which the ballast cups thereof are held in selected vertical positions through friction instead of through positive physical ledges and the like, as in FIGS. 1 and 2.
FIG. 18 is an enlarged, cross-sectional view thereof taken along line 18—18 of FIG. 17.
FIG. 19 is a fragmentary, vertical cross-sectional view thereof taken along line 19—19 of FIG. 18, and showing, on an exaggerated basis, the way in which a certain amount of deflection occurs in the outer housing in order for the ballast cups to be held frictionally in place along the latter.
FIG. 20 is a view similar to FIG. 18, but with the cup rotated ninety degrees (90°) so as to permit vertical adjustment thereof along the assembly.

FIGS. 12 and 16 illustrate what might be termed a "universal" anti-siphon break, in view of the fact that it may be used in connection with virtually any overflow pipe 24, regardless of the details of construction of the specific level control assembly. To this end, the universal anti-siphon break comprises an attachment in the form of a cap 124 designed to slip into place on top of the open upper end of the pipe 24. The cap 124 includes a continuous annular wall 126 which circumscribes the upper end of the pipe 24 when the cap 124 is in place, there being an annular locating shoulder 128 on the inner surface of the wall 126 which rests upon the uppermost annular edge 130.

The wall 126 and the shoulder 128 define a circular entry 132 through which overflow liquid can enter the pipe 24. Within the entry 132 is eccentrically disposed a supporting ring 134 that is integrally attached to the inner surface of the wall 126 at a certain circumferential location on the latter. Three radially extending struts 136 project inwardly from the support ring 134 and carry an upright, tubular connector 138 having an open uppermost end adapted for insertion into the conduit 26 and an open lowermost end positioned for fluid discharge into the pipe 24. Inasmuch as the connector 138 is diametrically smaller than the ring 134, and in view of the use of the struts 136, three segmental open spaces 138 are presented about the discharge end of the connector 138 for communicating the latter with the atmosphere.

Preferably, all of the various parts of the cap 124 are integrally interconnected. This particular component may be conveniently fabricated from a suitable plastic material, as in the case with all of the components of the assembly 10, except for the diaphragm 44 and the coil spring 86 associated with the pilot valve 80.

FIGS. 17, 18, 19 and 20 are directed to a second version of the assembly 10, denoted broadly by the numeral 210. The assembly 210 is similar in all respects to the assembly 10, save for the manner in which the ballast cups 214 and 218 are vertically adjustable along the housing 288. In this regard, the housing 288 is not provided with the ledges 110 of housing 88. The housing 288 does have relieved strips 212, however, which are reduced diameter areas with respect to the surrounding surfaces of the housing 288. The ballast cups 214 and 218 continue to be provided with opposed shoulders in the nature of the shoulders 216 on the upper cup 214, similar to the shoulders 116 on the upper cup 114 of the first embodiment. When the shoulders 216 are in alignment with the relieved strips 212, as illustrated in FIG. 20, the cup 214 may be adjusted vertically along the housing 288, while when the cup 214 is rotated out of the position of FIG. 20 to a position as illustrated in FIG. 18, the shoulders 216 slightly distort the housing 288, as illustrated in FIG. 19, so that the cup 214 is frictionally held against movement out of its selected vertical position. The same manner of operation holds true for the lower cup 218.

OPERATION

In view of the similarity in operation of the assemblies 10 and 210, only the operation of assembly 10 will be hereafter described, it being fully understood, however, that the description applies as well to the assembly 210, except for the manner in which the latter's cups 214 and 218 are adjusted as above-explained.

The upper and lower ballast members 114, 118 may be positioned at any selected point along the housing 88. The position selected for the upper ballast member 114 determines the upper level of liquid within the tank 12, while the position of the lower ballast member 118 along the housing 88 determines the low level which the liquid will reach before the refill cycle is started. The positions illustrated in FIGS. 1 and 2, therefore, are exemplary only.

When the tank 12 is full, the liquid level is located approximately at point A on the upper ballast member 114. Thus, although both ballast members 114 and 118 are full of liquid at this time, their gravitational effect is negated by the fact that the density of the liquid they carry is the same as that surrounding them within the tank 12. Thus, the buoyancy provided by the trapped air within chamber 122 retains the housing 88 in its uppermost position as illustrated in FIG. 2, so that the valve stem 82 is not depressed. Also acting to keep the housing 88 raised is supply pressure against the head 84 of the pilot valve 80 derived from the fact that the small orifice 50 communicates the pressure chamber 76 with the inlet passage 36. Thus, the combined effects of supply pressure and buoyancy of the float 120 operate to yieldably maintain the housing 88 fully raised and the pilot valve 80 sealing the bore 78. This, of course, means that the diaphragm 44 will remain closed against the seat 40 since the force pushing downwardly on the upper side of the diaphragm 44 exceeds that available from the supply pressure on the lower side of the diaphragm 44.

As the liquid in the tank 12 falls, as a result of a flush cycle being started, or for some other reason if the assembly 10 is not utilized in a toilet installation, it drops below the upper ballast 114 so that the full gravitational effect of the liquid captured therewithin is felt. However, the volume of the ballast member 114 is calculated so that even when its full gravitational effects are available, it alone cannot overcome the combined upwardly directed force of the float 120 and the supply pressure acting against the head 84 of the pilot valve 80. Consequently, the refill cycle does not begin.

As the level of liquid continues to drop, it finally reaches point B at the lower edge of the float 120, causing the trapped air within chamber 122 to be instantaneously released and thereby terminating the buoyancy exerted by the float 120. By this time, the full gravitational effects of the liquid captured within the lower ballast member 118 also come into play and, combined with the effect of the upper ballast member 114, this is sufficient to overcome the supply pressure exerted against the pilot valve 80 since the latter now stands alone without the assistance of the float 120. Accordingly, the housing 88 drops down a short distance as the top 94 of the closure 92 depresses the valve stem 82. The lower limit of travel of the housing 88 is defined by the top surface of the cap 70 which engages the closure top 94 upon depression of the valve stem 82.

Such depression of the pilot valve stem 82 unseals the bore 78 so as to allow the trapped liquid within the pressure chamber 76 to immediately escape through the bore 78, thereby effectively reducing the liquid pressure within chamber 76 to zero and enabling the diaphragm 44 to be pushed upwardly off the seat 40 by the liquid within passage 36 at supply pressure. (Note that the cross channels 79 on the upper surface of cap 70 prevent the top 94 of closure 92 from restricting liquid flow through the bore 78. Note further that liquid escaping through bore 78 trickles down cap 70 and exits partially through opening 102 to replenish ballast liquid cup 114.) Thus, the incoming liquid from passage 36 is communicated with the annular passage 54 between the tube 28 and the sleeve 52 so that it can travel down through such annular passage 54 and exit the latter slightly above the flange 34 to commence refill of the tank 12. (Note that this also initiates flow of liquid through the lateral aperture 106, the fitting 104 and the refill line 26 leading to the upstanding refill pipe 24 so that the bowl is likewise refilled at the same time that the tank 12 is replenished.)

As the liquid level thus begins to rise in the tank 12, air once again becomes trapped within the chamber 122 of the float 20, providing a buoyancy force that seeks to raise the housing 88. However, this buoyancy force alone is unable to overcome the gravitational effects of the two ballast members 114 and 118 so that the housing 88 remains in its lowered position with the valve diaphragm 44 unseated. Hence, the refill cycle continues.

As the liquid level within the tank 12 continues to rise, it passes the upper edge of the lower ballast member 118, thereby canceling out the gravitational effects of the latter. However, the gravitational effect of the upper ballast member 114 remains, and this is sufficient to overcome the buoyancy of the float 120 so that the refill cycle continues. Finally, as the level reaches upper point A, the gravitational effect of the upper ballast member 114 is also effectively canceled out, and at that point, the buoyancy of the float 120 is effective to lift the housing 88 and thereby allow the return spring 86 to project the valve stem 82 through the bore 78 such as to seal the latter. This re-establishes a greater force in the pressure chamber 76 above the diaphragm 44 than below the same so that the diaphragm 44 flexes back down against the seat 40 so as to close off the passage 36 and terminate the refil cycle. Conditions as originally obtained when the tank 12 is full are therefore re-established.

It should thus be readily apparent that the assembly 10 functions entirely without the aid of external operating mechanism. It will automatically maintain very close to a single predetermined level within a tank if such is desired, this being made possible by simply adjusting the lower ballast 118 so that it is fully up against the upper ballast 114. On the other hand, if a delay is sought in initiation of the refill cycle, such as is desirable in toilets to avoid the wastage of water as is common in conventional ball cocks, then the lower ballast member 118 may be adjusted to any selected lower position along the housing 88 so as to delay the initiation of the refill cycle until the liquid level drops to the critical point.

It should also be pointed out that initial assembly and installation of the valve assemly 10 is quite simple and can be accomplished totally without the assistance of tools, save only perhaps for the particular manner in which the lower threaded end 30 of the upright tube 28 is secured to the tank. Thus, adjustment, maintenance and replacement of parts are all rendered greatly simplified to the end that a highly desirable advancement in the art is made.

The way in which the integral anit-siphon break (fitting 104, aperture 106 and holes 108) works, and the way in which the universal anti-siphon break 124 functions should be apparent from the earlier description thereof. Suffice it to point out that in the integral break, if the supply pressure should change from positive to negative, such that a vacuum is created which would seek to suck the liquid out of the tank 12, such suction will be broken because of the communication of the passages 36 and 53 with the atmosphere through holes 108.

Likewise, even though the universal anti-siphon break 124 is remote from the assembly 10, as illustrated in FIG. 12, the effect is the same because the lower end of the connector 138 is in position to communicate with the atmosphere. Consequently, the supply passages 36 and 54 are themselves communicated with the atmosphere to break any suction that would otherwise tend to draw the liquid out of the tank.

I claim:

1. A liquid level control assembly for use in connection with a liquid storage tank having an inlet through which liquid enters the tank under a supply pressure, said assembly comprising:
   a valve shiftable between a closed position preventing liquid from entering the tank through said inlet and an open position permitting said entry; and
   valve-operating means for operating said valve when the liquid level in said tank drops to a lower predetermined level and for then reclosing the valve when the liquid level rises to an upper predetermined level,
   said valve-operating means including a float for closing said valve when the liquid level reaches said upper predetermined level and gravity-operated means so disposed with respect to said float as to open said valve when the liquid level drops to said lower predetermined level,
   said gravity-operated means being adjustably coupled with said float and said valve in such manner as to permit selective adjustment of said lower predetermined level independently of the location of said upper predetermined level.

2. A liquid level control assembly as claimed in claim 1, wherein said operating means includes a pair of separate ballast members interconnected in superimposed relationship for combining the valve opening gravitational effects thereof when the liquid drops to said lower level, the lower of said pair of members having means releasably retaining the same in a selected vertical position relative to the upper of said pair of members.

3. A liquid level control assembly as claimed in claim 2, wherein said float and said lower ballast member are interconnected for movement in unison.

4. A liquid level control assembly as claimed in claim 3, wherein said float is located at the bottom of said lower ballast member.

5. A liquid level control assembly as claimed in claim 2, wherein said upper ballast member is provided with means for releasably retaining the same in a selected vertical position relative to the tank for adjustable determination of said upper liquid level.

6. A liquid level control assembly as claimed in claim 2, wherein said ballast members are in the nature of cups for the unrestricted entry into the same of the liquid being stored in the tank.

7. A liquid level control assembly for use in connection with a liquid storage tank having an inlet through which liquid enters the tank under a supply pressure, said assembly comprising:

a valve shiftable between a closed position preventing liquid from entering the tank through said inlet and an open position permitting said entry; and valve-operating means for opening said valve when the liquid level in said tank drops to a lower predetermined level and for then reclosing the valve when the liquid level rises to an upper predetermined level, said valve-operating means including a float and means for selective adjustment of said lower predetermined level, said valve-operating means including a normally upright element shiftable between a pair of upper and lower dispositions corresponding to closing and opening of the valve, respectively, said element having a pair of upper and lower ballast members attached thereto that are jointly operable to combine their gravitational effects when the liquid drops to said lower level and thereby effect said shifting of the element to said lower disposition thereof against any resistance from said float, said lower ballast member having means releasably attaching the same to said element for selective adjustment of the lower ballast member along the element.

8. A liquid level control assembly as claimed in claim 7, wherein said releasable attaching means includes a series of transverse ledges spaced apart along the element and a shoulder on said lower ballast member, said element having a relieved strip common to and interconnecting said ledges for receiving said shoulder when the lower ballast member is rotated relative to said element, thereby permitting the lower ballast member to be slipped along the element until a selected ledge for said shoulder is reached.

9. A liquid level control assembly as claimed in claim 8, wherein said upper ballast member is provided with a shoulder cooperable with said ledges and said relieved strip in the same manner as the shoulder of said lower ballast member whereby to permit adjustment of the upper ballast member along said element for regulation of said upper liquid level.

10. A liquid level control assembly as claimed in claim 7, wherein said lower ballast member is of annular configuration and circumscribes said element, said releasable attaching means including a shoulder on the inner periphery of said lower member that is tightly frictionally engageable with the element to retain the lower member in a selected position, said element being provided with a longitudinally extending relieved strip wherein, when the shoulder is aligned with said strip, the frictional engagement of the lower member with the element is insufficient to retain the lower member in a selected vertical position.

11. A liquid level control assembly as claimed in claim 10, wherein said upper ballast member is provided with a shoulder cooperable with said element and said relieved strip in the same manner as the shoulder of said lower ballast member whereby to permit adjustment of the upper ballast member along said element for regulation of said upper liquid level.

12. A liquid level control assembly for use in conjunction with a liquid storage tank having an inlet through which liquid may enter the tank at a supply pressure, said assembly comprising:

an inlet tube connectable at one end to said tank inlet in liquid flow communication therewith, said tube having an annular valve seat at the opposite end thereof;

a valve diaphragm across said opposite end and flexible toward and away from said seat;

a sleeve receiving said tube in concentric relationship therewith and defining an annular passage therebetween, said sleeve having an annular terminus substantially flush with said opposite end of the tube and underlying a marginal periphery of said diaphragm;

interengageable interlock means between said tube and the sleeve operable to retain the same in said relationship with said opposite end and said terminus substantially flush upon manual relative rotation of the tube and the sleeve to effect said interengagement;

a cap threaded onto said sleeve and having a cavity registered with said diaphragm and receiving the latter when flexed away from said seat, said cap further having an annular abutment overlying said marginal periphery of the diaphragm and cooperating with said annular terminus of the sleeve to clamp the diaphragm in place, said cavity in the cap defining a chamber on the side of said diaphragm opposite said seat and said diaphragm having a pilot orifice therein communicating said chamber with the interior of said tube, the exposed surface area on the chamber side of the diaphragm being greater than that exposed to the interior of said tube when the diaphragm is against said seat;

a bore through said cap communicating said chamber with the exterior of the cap;

a pilot valve operable within said bore between a position sealing the same and a position opening the same, said valve having a stem that projects through said bore and beyond adjacent external surfaces of the cap when the pilot valve is in said sealing position thereof;

a tubular housing concentrically receiving said sleeve and extending a substantial length of said tube, said housing being reciprocable longitudinally of the tube and sleeve between upper and lower limits corresponding to said closing and opening of the diaphragm, respectively, said housing having an open upper end through which the sleeve, cap and tube may be inserted during assembly;

a closure for said open end of the housing;

manually interlockable structure on said closure and the housing for retaining the closure in place after insertion of said sleeve, cap and tube, said closure having an operating surface engaging said stem of the pilot valve; and float-ballast means manually detachably secured to the exterior of said housing for buoying said housing up to said upper limit when the liquid in said tank reaches an upper predetermined level to thereby seal said pilot valve and cause flexure of the diaphragm against said seat to close said opposite end of the tube, but for gravitationally pulling said housing down to said lower limit and thereby open said pilot valve to permit flexure of the diaphragm away from said seat to thereby open said opposite end of the tube when the liquid drops to a lower predetermined level in the tank.

13. A liquid level control assembly as claimed in claim 12, wherein said cavity in the cap has a surface spaced above said diaphragm, said surface of the cavity being provided with means for preventing vacuum sealing of the diaphragm against said surface of the cavity when the diaphragm is flexed away from said seat.

14. A liquid level control assembly as claimed in claim 13, wherein said means for preventing vacuum seal of the diaphragm includes rib means on said surface of the cavity.

15. A liquid level control assembly as claimed in claim 12, wherein said cap and said operating surface of the closure are provided with means between the same for preventing said operating surface from restricting flow out of said chamber through said pilot bore when said pilot valve is depressed by said operating surface.

16. A liquid level control assembly as claimed in claim 15, wherein said means between the closure and the cap includes channel means on said cap communicating with said bore and leading away from the same.

17. A liquid level control assembly as claimed in claim 12, wherein said float-ballast means includes a pair of separate ballast members attached to said housing along the length thereof, the normally lower of said members being selectively shiftable along the housing for adjustment of the location of said lower level at which said opposite end of the tube is opened.

18. A liquid level control assembly as claimed in claim 17, wherein said lower ballast member has a float at the bottom thereof.

19. A liquid level control assembly as claimed in claim 18, wherein said housing is provided with a series of transverse ledges spaced apart along the housing, said lower ballast member having a shoulder, said housing having a relieved strip common to and interconnecting said ledges for receiving said shoulder when the lower ballast member is rotated relative to said housing thereby permitting the lower ballast member to be slipped along the housing until a selected ledge for said shoulder is reached.

20. A liquid level control assembly as claimed in claim 19, wherein said upper ballast member is provided with a shoulder cooperable with said ledges and said relieved strip in the same manner as the shoulder of said lower ballast member whereby to permit adjustment of the upper ballast member along said housing for regulation of said upper liquid level.

21. A liquid level control assembly as claimed in claim 18, wherein said lower ballast member is of annular configuration and circumscribes said housing, said lower ballast member having a shoulder on the inner periphery thereof that is tightly frictionally engageable with the housing to retain the lower member in a selected position, said housing being provided with a longitudinally extending relieved strip wherein, when the shoulder is aligned with said strip, the frictional engagement of the lower member with the housing is insufficient to retain the lower member in a selected vertical position.

22. A liquid level control assembly as claimed in claim 21, wherein said upper ballast member is provided with a shoulder cooperable with said housing and said relieved strip in the same manner as the shoulder of said lower ballast member whereby to permit adjustment of the upper ballast member along said housing for regulation of said upper liquid level.

23. A liquid level control assembly as claimed in claim 12, wherein said upper end of the sleeve is provided with a transverse aperture communicating with said annular passage for delivering liquid to an external location, said opening being in atmospheric communication with a hole located above the normal upper liquid level in the tank so as to provide an anti-siphon atmospheric break in the annular passage.

* * * * *